United States Patent Office 3,597,475
Patented Aug. 3, 1971

3,597,475
PURIFICATION OF p-THIONYLAMINOBENZOYL CHLORIDE
Josef Pikl, Glassboro, N.J., assignor to E. I. du Pont de Nemours and Company, Wilmington, Del.
No Drawing. Filed Dec. 28, 1967, Ser. No. 694,058
Int. Cl. C07c 51/58, 53/00
U.S. Cl. 260—544    4 Claims

ABSTRACT OF THE DISCLOSURE

Purification of crude p-thionylaminobenzoyl chloride with chlorofluorinated hydrocarbon solvents and preparation of high purity p-aminobenzoyl chloride hydrochloride therefrom by treatment with hydrogen chloride.

BACKGROUND

The compound p-thionylaminobenzoyl chloride and its preparation by the reaction of thionyl chloride with p-aminobenzoic have been well known for several years. Early investigators reported difficulty in obtaining p-thionylaminobenzoyl chloride in a pure form, the product decomposing on distillation under reduced pressures (see Carré and Libermann, Compt. Rend. 201, 147–149, 1935). More recently E. Riesz [Revista de la Facultad de Humanidades y Ciencias, Montevideo 2, No. 3, 65–73 (1958)] attributed this decomposition to the presence of other materials in the crude reaction product. This was substantiated by Riesz, having found a diamide on treating with water the residue of the first distillation of the product of the reaction between thionyl chloride and p-aminobenzoic acid. Nevertheless Riesz obtained yellow crystals of p-thionylaminobenzoyl chloride, as did Graf and Langer [J. Prakt. Chem. 148, 161–9 (1937)]. They worked with small quantities and succeeded in preparing small amounts of the product.

However, when the manufacture of large scale quantities is desired, the formation of by-products and tars is greatly increased. Distillation of amounts greater than about 500 grams has been found to be impractical, since the crude product undergoes severe decomposition on distillation with a slow evolution of gas.

p-Thionylaminobenzoyl chloride is a valuable intermediate for the preparation of p-aminobenzoyl chloride hydrochloride, which is an important monomer for the preparation of high molecular weight polymers suitable for the production of fibers and films.

These fibers and films have high thermal stability which is affected by the presence of by-products and tars. It is therefore important that the intermediate p-thionylaminobenzoyl chloride and the monomer p-aminobenzoyl chloride hydrochloride be obtained in a pure state.

It is therefore among the objectives of this invention to provide a process for obtaining pure p-thionylaminobenzoyl chloride and pure p-aminobenzoyl chloride hydrochloride therefrom.

BRIEF SUMMARY OF INVENTION

Crude p-thionylaminobenzoyl chloride prepared from the reaction of thionyl chloride and p-aminobenzoic acid is purified according to the present invention by treating the crude with a chlorofluorinated hydrocarbon solvent selected from trichlorofluoromethane, 1,1,2-trichlorotrifluoroethane, 1,2-dichlorotetrafluoroethane and dichlorofluoromethane at about room temperature, filtering and removing said solvent from the filtrate by evaporation under vacuum.

Further purification may be achieved by subsequently distilling said purified product, preferably in a wiped film evaporator at about 1–3 mm. Hg (millimeters mercury) pressure. Optionally, this treatment may be carried out directly in the reaction mixture, before removal of excess thionyl chloride.

High purity p-aminobenzoyl chloride hydrochloride is obtained by treating the solvent solution of p-thionylaminobenzoyl chloride, after filtration, with hydrogen chloride gas at about room temperature, holding the reaction at this temperature for from about 0.5 to 1.5 hours or until absorption substantially ceases, recovering the resultant insoluble product by filtration and drying in a dry atmosphere.

DETAILED DESCRIPTION OF INVENTION

Surprisingly it has now been found that certain solvents are unique in their ability to dissolve selectively p-thionylaminobenzoyl chloride in the presence of the by-products and tars formed by the reaction of p-aminobenzoic acid and thionyl chloride. These solvents are trichlorofluoromethane, 1,1,2-trichlorotrifluoroethane, 1,2-dichlorotetrafluoroethane and dichlorofluoromethane. The action of these solvents is completely unexpected, inasmuch as the structurally similar carbon tetrachloride does not show this selectivity. Other solvents, such as, diethylether, methylene chloride, benzene and the like, do not provide a high degree of purification.

When purified by extraction with the aforementioned fluorinated solvents, additional purification by distillation is not necessary in most instances for use as an intermediate in the preparation of high molecular weight polymers.

If further purification is desired, the purified p-thionylaminobenzoyl chloride can be safely distilled with much less decomposition than previously attainable, indicating that a pure, more stable product has been obtained.

Distillation is preferably performed in a wiped film, or falling film, evaporator at from about 1 to 3 mm. Hg. Such evaporators and their application in distillation processes are well-known as discussed in Chemical Engineering, Sept. 13, 1965, pp. 175–190, McGraw-Hill, Inc.

The crude p-thionylaminobenzoyl chloride, either after recovery from the reaction mixture or while still in the reaction mixture from which the excess thionyl chloride has not been removed, is treated with the chlorofluorinated hydrocarbon solvent at about room temperature, that is, at from about 20° to 50° C. The amount of solvent necessary for the extraction is dependent upon the temperature employed, about 2 to 10 parts by weight of solvent per part of the crude generally being sufficient. For example, when the solvent is 1,1,2-trichlorotrifluoroethane, a weight ratio of about 7 to 1 is required at 22° C., while a weight ratio of only about 2 or 3 to 1 is required at 30° C.

The boiling point of 1,1,2-trichlorotrifluoroethane is 47.6° C. The boiling points of the other solvents are lower, 23.8° C. for trichlorofluoromethane, 3.6° C. for 1,2-dichlorotetrafluoroethane and 8.9° C. for dichlorofluoromethane. Since the low solubility of p-thionylaminobenzoyl chloride below about 20° C. dictates a preferred extraction temperature range of at least about 28°–30° C., it is sometimes desirable to use slightly elevated pressures when employing the lower boiling solvents. For example, at a temperature of about 30° C., the process is operated at about 7.9 p.s.i. when using trichlorotrifluoroethane and at about 37 p.s.i. when using dichlorotetrafluoroethane. At 50° C., the respective pressures used with these solvents would be about 16 p.s.i. and 65 p.s.i. Use of the lower boiling solvents facilitates solvent removal after filtration.

After solvent treatment, the solvent solution is filtered in a dry (substantially moisture-free) atmosphere such as dry air or nitrogen to remove insoluble impurities. The solvent is then removed by evaporation, a slight vacuum being employed towards the end of the operation to enhance the removal rate. As above discussed, the purified product may be used "as is" or further purified by distillation at about 1-3 mm. Hg, preferably in a wiped film evaporator.

A further embodiment of this invention is the facility with which pure p-aminobenzoyl chloride hydrochloride may be obtained from the solvent solution of p-thionylaminobenzoyl chloride, after filtration, by treatment thereof with hydrogen chloride gas at about room temperature until absorption substantially ceases, i.e., for about 0.5 to 1.5 hours. The p-aminobenzoyl chloride hydrochloride, which forms as a white precipitate, is then recovered by filtration and drying in a dry air or nitrogen atmosphere. After filtration, the press cake may be washed with additional solvent before drying.

EXAMPLES

The following examples serve to describe the invention in further detail. The examples are intended to be merely illustrative of the invention and not in limitation thereof.

Example 1.—Preparation of p-thionylaminobenzoyl chloride p-Aminobenzoic acid (1100 grams) is added to 4880 grams thionyl chloride (1:5.1 mol ratio) at room temperature, the mixture gradually heated with agitation to 80° C. and held at that temperature until all the product is in solution, about 6 hours. The excess thionyl chloride is distilled by applying a vacuum of about 60 mm. Hg. The dark colored, liquid reaction product weighs 1647 grams.

Example 2.—Extraction of p-thionylaminobenzoyl chloride with 1,1,2-trichlorotrifluoroethane 326 grams of the product obtained in Example 1 is added with agitation to 2,000 g. of 1,1,2-trichlorotrifluoroethane at room temperature. Most of the product dissolves giving a clear yellow solution and a dark colored insoluble fraction, which is filtered and dried. The yield of the solvent insoluble material is 7.7 g., equal to 2.4% of the crude material.

Example 3.—Conversion to p-aminobenzoyl chloride hydrochloride

Into the solvent solution remaining in Example 2 after filtration of insoluble residue, dry hydrogen chloride is introduced until absorption ceases. A total of 176 g. hydrogen chloride is used. A white precipitate forms which is filtered and washed with 1,1,2-trichlorotrifluoroethane and dried at room temperature in a stream of dry nitrogen. A yield of 286 g. of pure p-aminobenzoyl chloride hydrochloride is obtained, equal to 93% yield based on p-aminobenzoic acid used.

Example 4.—Distillation of crude p-thionylaminobenzoyl chloride

When 300 g. of the crude product as obtained in Example 1 are distilled at 1-1.5 mm. Hg pressure, a yield of 240 g., 80% yield of theory, based on the crude, of distilled product is obtained and 14.7% of a tarry residue, indicating some decomposition of p-thionylaminobenzoyl chloride during the distillation.

Example 5.—Distillation of solvent extracted p-thionylaminobenzoyl chloride

When 300 g. of crude p-thionylaminobenzoyl chloride, as obtained in Example 1, and purified by solvent extraction as described in Example 2, is distilled at 1-1.5 mm. Hg pressure, 255 g. of product, 85% yield, is obtained, indicating a purer product.

Example 6.—Purification and conversion in presence of thionyl chloride

This example illustrates a simplified method of obtaining pure product directly from the reaction mixture of p-aminobenzoic acid and thionyl chloride, from which the excess thionyl chloride had not been removed.

To 800 g. of the dark colored crude reaction mixture, obtained by reacting 222 g. p-aminobenzoic acid with 960 g. thionyl chloride, 1900 g. of 1,1,2-trichlorotrifluoroethane and 2 g. finely divided cellulose, as a filtration aid, are added at room temperature. The mixture is agitated for ½ hour and filtered. A very light colored solution is obtained, which is converted directly with 186 g. of hydrogen chloride to 290 g. of p-aminobenzoyl chloride hydrochloride. A yield of 93% is obtained, based on the p-aminobenzoic acid used.

Example 7.—Purification with trichlorofluoromethane (B.P. 23.8° C.)

15 g. of crude p-thionylaminobenzoyl chloride are dissolved in 45 cc. of trichlorofluoromethane and agitated at 20° C. for a few minutes, then filtered from the dark tarry material. The filtrate contains pure p-thionylaminobenzoyl chloride and is of a bright yellow color, indicating that essentially all the tarry material has been removed.

Example 8.—Purification of crude p-thionylaminobenzoyl chloride with 1,2 - dichlorotetrafluoroethane (B.P. 3.6° C.)

To 377 cc. of 1,2-dichlorotetrafluoroethane are added, at atmospheric pressure, 20 g. of crude p-thionylaminobenzoyl chloride and the solution is agitated at 0° C. The dark colored impurities and part of the p-thionylaminobenzoyl chloride remain undissolved. After filtering the undissolved fraction and evaporating the filtrate, there remains 5 g. of bright yellow, pure p-thionylaminobenzoyl chloride.

When the above operation is carried out in a closed system at 25° C. and at a slightly elevated pressure (about 30 p.s.i.), all the p-thionylaminobenzoyl chloride dissolves. After filtration and evaporation of the solvent, a pure, bright yellow p-thionylaminobenzoyl chloride is obtained.

Example 9—Distillation of purified p-thionylaminobenzoyl chloride in a wiped film evaporator 91 pounds of p-thionylaminobenzoyl chloride, which has been purified by dissolving in 1,1,2-trichlorotrifluoroethane, are fed slowly into a commercial 4-inch wiped film evaporator built of staniless steel. The distillation is carried out at a pressure of 1.2 mm. Hg with a feed rate of 10.15 lbs. an hour. The distillate collected is 63.5 lbs. of pure p-thionylaminobenzoyl chloride equal to 70% of theory. The non-distilled fraction of 34.4 lbs. is dark colored but fluid. On extraction with 1,1,2-trichlorotrifluoroethane, 24 lbs. of p-thionylaminobenzoyl chloride are recovered from this fraction which is recycled in the wiped film evaporator giving another 14 lbs. of distillate, thus giving a total recovery of 85% of theory.

The solvent purification of the above used p-thionylaminobenzoyl chloride is carried out by dissolving 1 part of crude product (as obtained from the reaction of p-aminobenzoic acid with thionylchloride) in five parts of 1,1,2-trichlorotrifluoroethane at 30–40° C., filtering the undissolved fraction and evaporating the solvent under vacuum at 40–70° C.

It has thus been shown that by the use of certain solvents, a remarkably specific separation of p-thionylaminobenzoyl chloride can be achieved from tars and by-products. In addition, pure p-aminobenzoic acid hydrochloride can be prepared therefrom. These products can be polymerized to give polymers having a high inherent viscosity by procedures described in U.S. Pat. No. 3,225,011.

The foregoing detailed description has been given for clearness of understanding only and no unnecessary limitations are to be understood therefrom. The invention is not limited to the exact details shown and described, for obvious modifications will occur to those skilled in the art.

What is claimed is:

1. A process for the purification of crude p-thionylaminobenzoyl chloride prepared by reacting thionyl chloride with p-aminobenzoic acid which comprises: treating said p-thionylaminobenzoyl chloride with a chlorofluorinated hydrocarbon solvent selected from the group consisting of trichlorofluoromethane, 1,1,2-trichlorotrifluoroethane, 1,2-dichlorotetrafluoroethane and dichlorofluoromethane at about room temperature; filtering; and removing said solvent from the resultant filtrate by evaporation.

2. Claim 1 further comprising distilling the filtrate, after solvent removal, at from about 1 to 3 mm. Hg pressure.

3. Claim 2 wherein said distillation is carried out in a wiped film evaporator.

4. Claim 1 wherein said crude p-thionylaminobenzoyl chloride is treated while in the presence of unreacted thionyl chloride.

References Cited

UNITED STATES PATENTS 2,763,678  9/1956  Grimme _____ 260—471

CHARLES B. PARKER, Primary Examiner

E. J. GLEIMAN, Assistant Examiner